United States Patent [19]

Hitomi et al.

[11] Patent Number: 4,679,531
[45] Date of Patent: Jul. 14, 1987

[54] INTAKE SYSTEM FOR INTERNAL COMBUSTION ENGINE

[75] Inventors: Mitsuo Hitomi; Fumio Hinatase; Yasuhiro Yuzuriha, all of Hiroshima, Japan

[73] Assignee: Mazda Motor Corporation, Japan

[21] Appl. No.: 795,443

[22] Filed: Nov. 6, 1985

[30] Foreign Application Priority Data

Nov. 8, 1984 [JP] Japan ............................ 59-235440
Dec. 29, 1984 [JP] Japan ............................ 59-275487

[51] Int. Cl.⁴ .......................................... F02M 31/00
[52] U.S. Cl. ............................................. 123/52 MB
[58] Field of Search ................ 123/52 M, 52 MB, 432

[56] References Cited

U.S. PATENT DOCUMENTS

| | | | |
|---|---|---|---|
| 2,862,490 | 12/1958 | Trisler | 123/52 MB |
| 3,814,069 | 6/1974 | Croft et al. | 123/52 M |
| 4,304,211 | 12/1981 | Tezuka et al. | 123/432 |
| 4,445,480 | 5/1984 | Inoue et al. | 123/432 |
| 4,565,166 | 1/1986 | Tekeda | 123/52 MB |

FOREIGN PATENT DOCUMENTS

| | | |
|---|---|---|
| 221123 | 7/1971 | Japan . |
| 4007 | 1/1978 | Japan . |
| 115819 | 9/1981 | Japan . |
| 110765 | 7/1982 | Japan . |
| 58-27529 | 2/1983 | Japan . |
| 116726 | 8/1983 | Japan . |
| 138456 | 10/1984 | Japan . |

Primary Examiner—Craig R. Feinberg
Attorney, Agent, or Firm—Gerald J. Ferguson, Jr.; Ronni S. Malamud; Michael P. Hoffman

[57] ABSTRACT

An intake system for an internal combustion engine has an intake passage comprising a common passage portion opening to the atmosphere, a surge tank connected to the downstream end of the common passage portion and a plurality of discrete passage portions branching from the surge tank and respectively connected to the cylinders. At least one interconnecting passage is provided to communicate each of the discrete passage portions with at least one of the other discrete passage portions at a portion downstream of the surge tank, and an on-off valve is disposed at each junction of the interconnecting passage with the discrete passage portions to open and close each junction. The on-off valve is opened at least when the engine speed exceeds a predetermined speed during heavy load operation of the engine.

32 Claims, 12 Drawing Figures

INTAKE SYSTEM FOR INTERNAL COMBUSTION ENGINE

BACKGROUND OF THE INVENTION

1. Field of the Invention

This invention relates to an intake system for an internal combustion engine, and more particularly to an intake system for an internal combustion engine in which the engine output power is improved by the kinetic effect of intake air.

2. Description of the Prior Art

As is well known, a negative pressure wave generated in an intake system of an internal combustion engine upon the initiation of each intake stroke is propagated upstream of the intake system and is then reflected at an end of the system opening to the atmosphere or to a surge tank disposed on a upstream side of the intake system toward the intake port as a positive pressure wave. By arranging the intake system so that the positive pressure wave reaches the intake port immediately before closure of the intake valve to force intake air into the combustion chamber, the volumetric efficiency can be improved. There has been known various intake systems in which such inertia effect or resonance effect of intake air is used for improving the volumetric efficiency. However, the period of vibration of the pressure wave in the intake passage can be matched with the period of opening and closure of the intake valve to obtain a sufficient inertia effect of the intake air only within a limited engine speed range which depends upon the shape of the intake passage. There has been proposed an intake system in which, for instance, the length of the intake passage is changed according to the engine speed in order to obtain an inertia effect of intake air over a wider engine speed range. For example, in the intake system disclosed in Japanese Unexamined Patent Publication No. 56(1981)-115819, each of the discrete intake passage portions leading to the respective combustion chambers is bifurcated to form a long passage portion and a short passage portion both opening to a surge tank or the like at the upstream end, and an on-off valve is provided in the short passage portion to open the short passage portion in a high engine speed range to shorten the effective length of the discrete intake passage portion, thereby obtaining a sufficient inertia effect of intake air in the high engine speed range in addition to a low engine speed range. (See FIG. 6 of the Japanese unexamined patent publication described above.)

In the intake system described above, the volumetric efficiency for one cylinder is improved by the inertia effect of intake air generated by pressure propagation only in the discrete intake passage portion leading to the cylinder. If the pressure propagation in the discrete intake passages leading to other cylinders can be effectively utilized, the volumetric efficiency will be able to be further improved.

SUMMARY OF THE INVENTION

In view of the foregoing observations and description, the primary object of the present invention is to provide an intake system for a multicylinder internal combustion engine in which the inertia effect of intake air can be effectively utilized to improve the volumetric efficiency in both the low engine speed range and the high engine speed range, and at the same time, the inertia effect of intake air in each discrete intake passage portion can be enhanced by the pressure wave in at least one of the other discrete intake passage portions especially in high engine speed ranges.

Another object of the present invention is to accomplish the above object without substantially enlarging the overall size of the intake system.

The intake system of the present invention has an intake passage comprising a common passage portion opening to the atmosphere, a surge tank connected to the downstream end of the common passage portion and a plurality of discrete passage portions branching from the surge tank and respectively connected to the cylinders. At least one interconnecting passage is provided to communicate each of the discrete passage portions with at least one of the other discrete passage portions at a portion downstream of the surge tank, and an on-off valve is disposed at each junction of the interconnecting passage with the discrete passage portions to open and close each junction. The on-off valve is opened at least when the engine speed exceeds a predetermined speed during heavy load operation of the engine.

In this intake system, in the low engine speed range lower than the predetermined speed, the on-off valves are closed and intake air is introduced into each combustion chamber by way of an effectively longer passage including the part of each discrete passage portion between the surge tank and the junction of the discrete passage portion and the interconnecting passage so that the period of the vibration of the pressure wave in the intake passage can be matched with the period of opening and closure of the intake valve to obtain a sufficient inertia effect of intake air in the low engine speed range. On the other hand when the on-off valve is opened in the high engine speed range, the negative pressure wave generated upon initiation of each intake stroke in each of the combustion chambers and propagated upstream of the discrete passage portion corresponding thereto is reflected at the junction of the discrete passage with the interconnecting passage as a positive pressure wave toward the combustion chamber to force intake air into the combustion chamber and at the same time the pressure wave(s) from the other discrete passage portion(s) connected to the discrete passage portion by way of the interconnecting passage is propagated thereto to further improve the volumetric efficiency.

In one preferred embodiment of the present invention, the interconnecting passage is defined by a part of a wall forming the surge tank in order to compactly form the whole intake system.

BRIEF DESCRIPTION OF THE THE DRAWINGS

FIG. 1 is a schematic cross-sectional view showing an internal combustion engine provided with an intake system in accordance with an embodiment of the present invention, FIG. 2 is a plan view thereof, FIG. 3 is a graph showing engine rpm-volumetric efficiency characteristic curves for illustrating the effect of the intake system of the present invention, FIG. 4 is a simplified view of an intake system equivalent to the intake system shown in FIG. 1 for illustrating the principle of operation of the intake system of the present invention, FIG. 5 is a view showing the waveforms of the pressure waves near the intake ports of the respective cylinders for illustrating the principle of operation of the intake system of the present invention, FIG. 6 is a cross-sectional view showing a modification of the engine shown in FIG. 1

FIG. 7 is a cross-sectional view of an internal combustion engine provided with an intake system in accordance with a concrete embodiment of the present invention, FIG. 8 is a perspective view partly broken away of the engine of FIG. 7, FIG. 9 is a cross-sectional view taken along line IX—IX in FIG. 7, FIG. 10 is a cross-sectional view taken along line X—X in FIG. 7, FIG. 11 is a cross-sectional view of an internal combustion engine provided with an intake system in accordance with another concrete embodiment of the present invention, and FIG. 12 is a plan view similar to FIG. 2 but showing another embodiment of the present invention in which the present invention is applied to a six-cylinder engine.

DESCRIPTION OF THE PREFERRED EMBODIMENTS

The principle of operation of the intake system in accordance with the present invention will now be described with reference to FIGS. 1 to 5.

Figure 1:
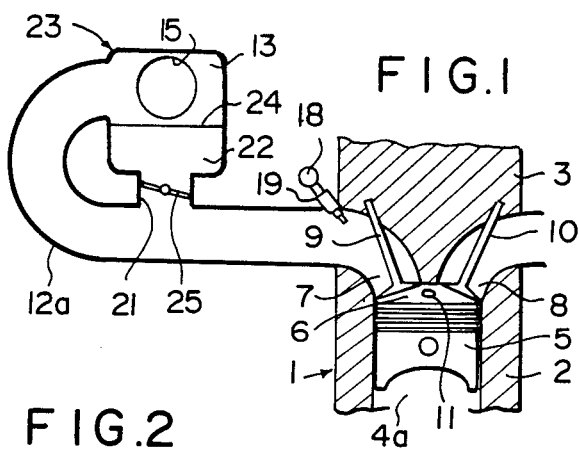
Figure 2:
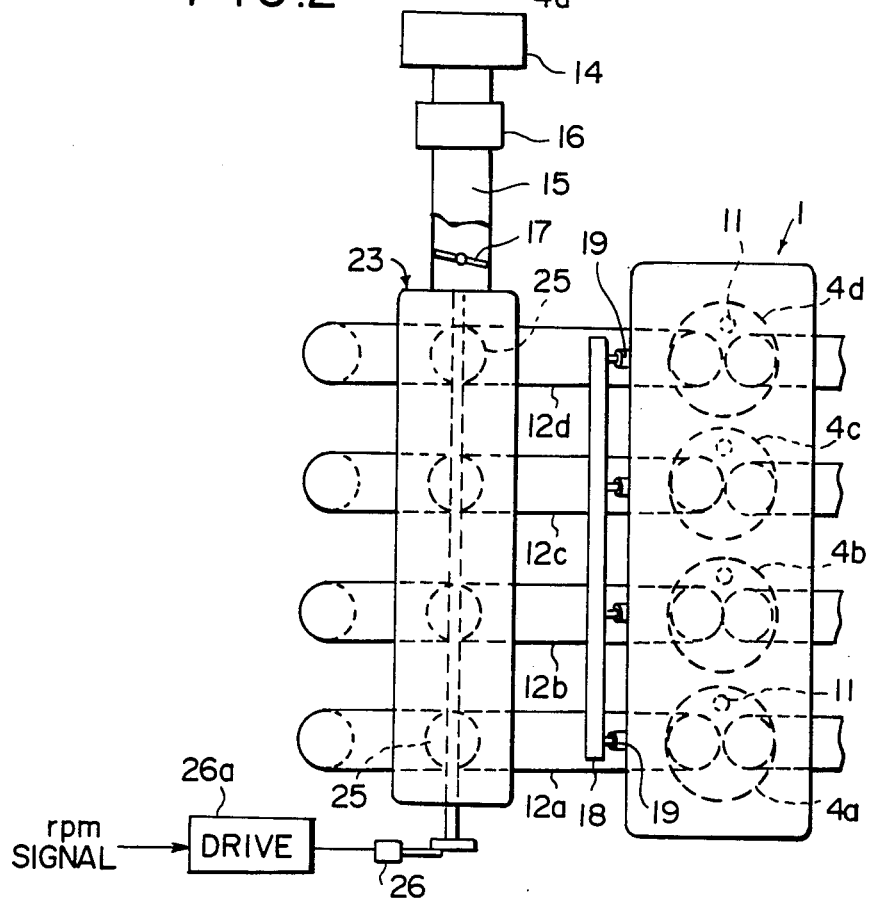
Figure 3:
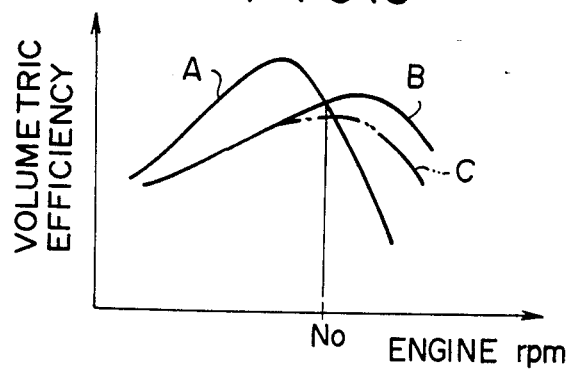

In FIGS. 1 and 2, a four-cylinder four-cycle engine provided with an intake system of the present invention comprises an engine body 1 formed by a cylinder block 2 and a cylinder head 3. First to fourth cylinders 4a to 4d are defined in the engine body 1. In each of the cylinders 4a to 4d, a combustion chamber 6 is defined above a piston 5 received in the cylinder. An intake port 7 and an exhaust port 8 are open to the combustion chamber 6, and an intake valve 9 and an exhaust valve 10 are respectively provided in the intake port 7 and the exhaust port 8. The combustion chamber 6 is further provided with an ignition plug 11.

Intake air is introduced into the combustion chambers 6 through an intake passage comprising a common passage portion 15 opening to the atmosphere by way of an air cleaner 14, a surge tank 13 connected to the downstream end of the common passage portion and first to fourth discrete passage portions 12a to 12d branching from the surge tank 13 and respectively connected to the first to fourth cylinders 4a to 4d. An airflow meter 16 is provided in the common passage portion 15 downstream of the air cleaner 14, and a throttle valve 17 is provided in the common passage portion 15 downstream of the airflow meter 16. A fuel injection valve 19 is provided in each discrete passage portion (12a to 12d) near the downstream end thereof and is connected to a fuel supply line 18.

An interconnecting passage 22 is connected to the discrete passage portions 12a to 12d at intermediate portions thereof and is communicated with the respective discrete passage portions 12a to 12d by way of communicating openings 21, whereby the discrete passage portions 12a to 12d are mutually communicated. The surge tank 13 and the interconnecting passage 22 are formed integrally with each other in an enlarged portion 23 formed at an intermediate portion of the intake passage. That is, the internal space of the enlarged portion 23 is divided into an upper space and a lower space by a partition wall 24, the former being larger than the latter and, the former and the latter respectively forming the surge tank 13 and the interconnecting passage 22. The communicating openings 21 are formed in the lower wall of the enlarged portion 23. Each discrete passage portion is bent upward and connected to a side of the surge tank 13 at its upstream end. This arrangement is advantageous in compactly forming the whole intake system.

Each communicating opening 21 is provided with an on-off valve 25 which is driven by an actuator 26 to close the communicating opening 21 in the low engine speed range lower than a predetermined engine speed and to open the same in the high engine speed range not lower than the predetermined engine speed. The actuator 26 is driven a driving circuit 26a which receives a rpm signal from an engine speed detecting means (not shown).

When the on-off valves 25 are closed, the negative pressure wave generated upon initiation of each intake stroke in each combustion chamber propagated through the discrete passage portion corresponding thereto to the surge tank 13 and is reflected at the surge tank 13 as a positive pressure wave toward the combustion chamber. The overall length of each discrete passage portion is selected so that the period of the vibration of the pressure wave in the intake passage can be matched with the period of opening and closure of the intake valve 9 to enhance the inertia effect of intake air in the low engine speed range. During heavy load operation of the engine, the relation between the engine rpm and the volumetric efficiency is as shown by curve A in FIG. 3 when the on-off valves 25 are closed. As can be understood from the curve A, the volumetric efficiency is enhanced in the low speed range when the on-off valves 25 are closed. On the other hand, when the on-off valves 25 are opened, the negative pressure wave generated upon initiation of each intake stroke is reflected at the interconnecting passage 22 so that the distance over which the negative pressure wave and the reflected wave travel is shortened, that is effective length of the discrete passage portion is shortened, and accordingly the period of the vibration of the pressure wave in the intake passage can be matched with the period of opening and closure of the intake valve 9 in the high engine speed range to enhance the inertia effect of intake air. At the same time, the inertia effect of intake in each discrete passage portion is further enhanced by the pressure waves propagated from the other discrete passage portions through the interconnecting passage 22, as will be described in detail later. During heavy load operation of the engine, the relation between the engine rpm and the volumetric efficiency is as shown by curve B in FIG. 3 when the on-off valves 25 are opened. As can be understood from the curve B, the volumetric efficiency is enhanced in the high speed range when the on-off valves 25 are opened.

By setting said predetermined engine speed at the engine speed No corresponding to the intersection of the curves A and B, that is, by opening the on-off valves 25 when the engine speed is higher than the engine speed No and closing the on-off valves 25 when the engine speed is not higher than the engine speed No, the volumetric efficiency can be improved to improve the engine output over the entire engine speed range. Especially in the high engine speed range, the volumetric efficiency is more enhanced as compared with the case where the effective length of the discrete passage portion is simply shortened as will be understood from curve C in FIG. 3 which shows the relation between the engine rpm and the volumetric efficiency when the effective length of the discrete passage portion is simply shortened.

Figure 4:
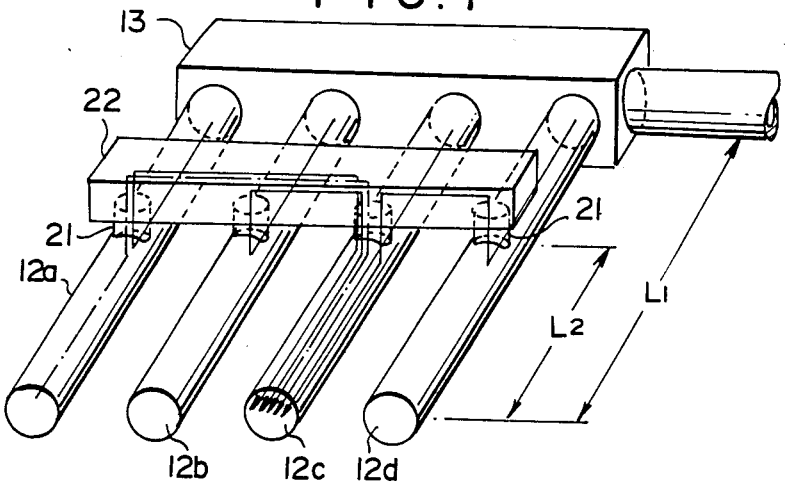

Behavior of the pressure waves in the high speed range will be described in detail with reference to FIGS. 4 and 5. FIG. 4 schematically shows an intake system equivalent to the intake system shown in FIGS. 1 and 2. In FIG. 4, reference character L1 denotes the passage length between the surge tank 13 and the downstream end of each discrete passage portion over which the negative pressure wave and the reflected pressure wave thereof are propagated in the low engine speed range or when the on-off valves 25 are closed, and reference character L2 denotes the passage length between the interconnecting passage 22 and the downstream end of each discrete passage portion. The solid line arrows and the chained line arrow in FIG. 4 respectively show the flow of intake air in the discrete passage portion corresponding to the cylinder which is in the intake stroke and the pressure waves propagated to the discrete passage portion from the other discrete passage portions while the engine speed is in the high engine speed range. As shown in FIG. 4, when, for instance, the third cylinder 4c is in the intake stroke in the high engine speed range in which the communicating openings 21 are opened, intake air is introduced into the third cylinder 4c from the surge tank 13 and the interconnecting passage 22 through the third discrete passage portion 12c. In this case, since a sufficient amount of intake air is supplied from the surge tank 13 through the upstream portion of the discrete passage portions 12a to 12d even if the interconnecting passage 22 is relatively small in volume, the interconnecting passage 22 can function as an air source for the part of the discrete passage portion 12c downstream of the interconnecting passage 22. Accordingly, the negative pressure wave generated in the intake stroke is reflected at the interconnecting passage 22 as a positive pressure wave as if the surge tank 13 is in the position of the interconnecting passage 22. When each of the other cylinders 4a, 4b and 4d is in the intake stroke, the negative pressure wave is reflected at the interconnecting passage 22 in the similar manner. The effective length of the intake passage which affects the inertia effect of intake air is thus shortened to L2 when the communicating openings 21 are opened. In this state, since the interconnecting passage 22 is relatively small in volume, the pressure wave generated in the discrete passage portion corresponding to the cylinder in the end of the intake stroke is propagated to the discrete passage portion corresponding to the cylinder which is in the intake stroke through the interconnecting passage 22. For example, when the third cylinder 4c is in the intake stroke, the pressure wave generated in the first discrete passage portion 12a is propagated to the third discrete passage portion 12c.

Figure 5:
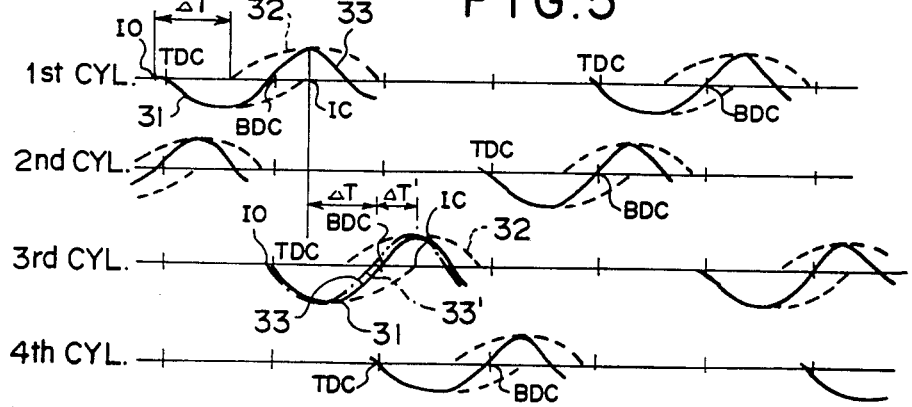

FIG. 5 shows the pressure wave generated near each intake port 7 and the pressure waves propagated to the third discrete passage portion 12c from the other discrete passage portions 12a, 12b and 12d. That is, the negative pressure wave 31 generated in each discrete passage portion in the intake stroke between the time the intake valve starts to open immediately before the top dead center TDC and the time the intake valve closes after the bottom dead center BDC is propagated upstream and is reflected at the interconnecting passage 22 as a positive pressure wave or the reflected pressure wave 32 toward the intake port as described above. The time $\Delta T$ required for the pressure wave to travel to the interconnecting passage 22 and return to the intake port is matched with the period of opening and closure of the intake valve in the high speed range so that a peak of the reflected pressure wave 32 reaches near the intake port in the end of the intake stroke. Thus, the pressure near the intake port becomes maximum near the end of the intake stroke as shown by the solid line 33 in FIG. 5. Further, for example, the pressure wave 33 generated in the first discrete passage portion 12a leading to the first cylinder 4a in the end of the intake stroke is propagated to the third discrete passage portion 12c leading to the third cylinder 4c in which the intake stroke occurs immediately after the first cylinder 4a. The time required for the pressure wave 33 to reach the third discrete passage portion 12c $\Delta T + \Delta T'$ (wherein $\Delta T'$ represents the time required for the pressure wave to travel through the interconnecting passage 22 between the junction of the first discrete passage portion 12a and the junction of the third discrete passage portion 12c) substantially corresponds to the time interval between the intake stroke in the first cylinder 4a and the same in the third cylinder 4c. Accordingly, the pressure wave 33' propagated to the third discrete passage portion 12c from the first discrete passage portion 12a acts in the end of the intake stroke in the third cylinder 4c substantially in the same phase as the pressure wave 33 generated in the third discrete passage portion 12c downstream of the interconnecting passage 22 to amplify the pressure wave 33. The same effect can be obtained in the other cylinder 4a, 4b and 4d though not shown in FIGS. 4 and 5.

In order to effectively obtain the effect described above, it is preferred that the surge tank 13 be more than 0.5 times as large the displacement of the engine in volume and the interconnecting passage 22 be not larger than 1.5 times as large as the displacement of the engine in volume. Further, it is preferred that the interconnecting passage 22 be smaller than the surge tank 13 in volume and be larger than each of the discrete passage portions 12a to 12d in cross section.

As will be apparent from the description above, the on-off valves 25 control propagation and reflection of the negative pressure wave generated in each intake stroke. Accordingly, it is not necessary for the on-off valves 25 to completely close the corresponding communicating openings 21 when they are closed so long as the pressure wave is not reflected at the interconnecting passage 22 when the on-off valves 25 are closed. In this respect, the expressions "the on-off valves 25 are closed", "the on-off valves 25 are in closed position", and the like should be interpreted, in this specification, to represent the state that the communicating openings 21 are closed at least to such an extent that is sufficient to prevent the negative pressure wave from being reflected at the interconnecting passage 22.

Further, though, in the description above, the on-off valves 25 are closed in the low engine speed range higher than a predetermined engine speed and opened in the higher engine speed range higher than the predetermined engine speed, other various controls may be effected according to the torque characteristic requirement so long as the on-off valves 25 are opened at least during heavy load operation of the engine.

Figure 6:
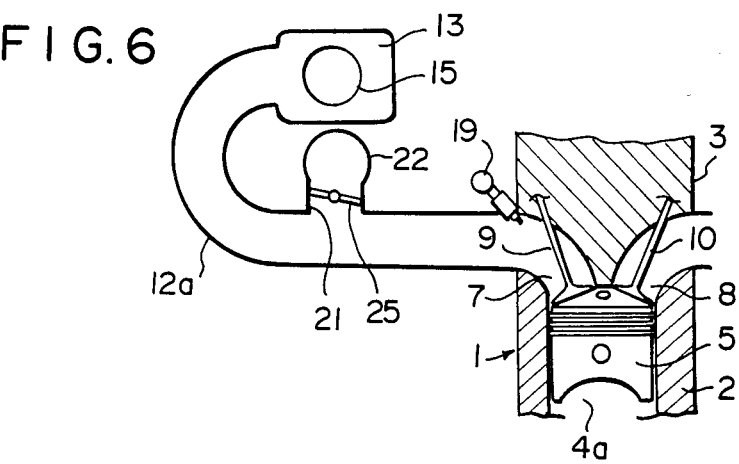
Figure 8:
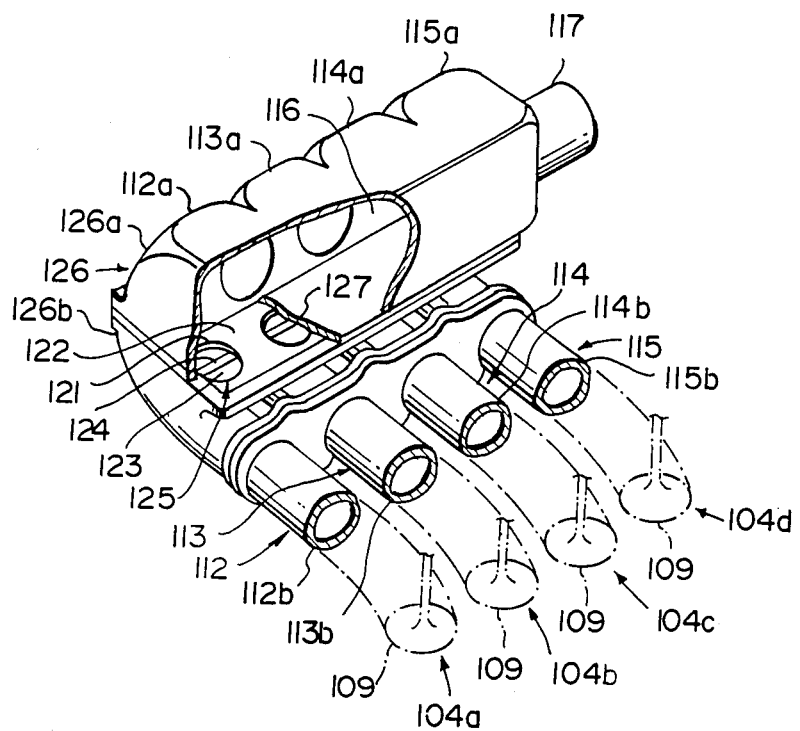

Further, though the surge tank 13 and the interconnecting passage 22 are formed integrally with each other in the engine shown in FIGS. 1 and 2, they may be formed separately as shown in FIG. 6.

Now an intake system in accordance with a first concrete embodiment of the present invention will be described with reference to FIGS. 7 to 10.

In FIGS. 7 to 10, a four-cylinder four-cycle engine provided with the intake system of embodiment comprises an engine body 101 formed by a cylinder block 102 and a cylinder head 103. First to fourth cylinders 104a to 104d are defined in the engine body 101 in line in the longitudinal direction of the engine body 101. In each of the cylinders 104a to 104d, a combustion chamber 106 is defined above a piston 105 received in the cylinder. An intake port 107 and an exhaust port 108 are open to the combustion chamber 106, and an intake valve 109 and an exhaust valve 110 are respectively provided in the intake port 107 and the exhaust port 108. The combustion chamber 106 is further provided with an ignition plug 111.

Intake air is introduced into the combustion chambers 106 through an intake passage comprising a common passage portion 117 opening to the atmosphere, a surge tank 116 connected to the downstream end of the common passage portion 117 and first to fourth discrete passage portions 112 to 115 branching from the surge tank 116 and respectively connected to the first to fourth cylinders 104a to 104d. The surge tank 116 extends in the longitudinal direction of the engine (in parallel to the crankshaft) so that the lengths of the discrete intake passage portions 112 to 115 are substantially equal to each other. A throttle valve 118 is provided in the common passage portion 117. A fuel injection valve 120 is provided in each discrete passage portion (112 to 115) near the downstream end thereof and is connected to a fuel supply line 119.

An interconnecting passage 122 is connected to the discrete passage portions 112 to 115 at intermediate portions thereof and is communicated with the respective discrete passage portions 112 to 115 by way of communicating openings 121, whereby the discrete passage portions 112 to 115 are mutually communicated. The interconnecting passage 122 extends substantially in parallel to the surge tank 116 so that the lengths between the communications openings 121 to the respective cylinders 104a to 104d are substantially equal to each other.

Each communicating opening 121 is provided with an on-off valve 123 which is connected to a valve shaft 124 extending in the longitudinal direction of the interconnecting passage 122 and is driven by an actuator (not shown) to close the communicating opening 121 in the low engine speed range lower than a predetermined engine speed and to open the same in the high engine speed range not lower than the predetermined engine speed under the control of a control circuit (not shown) which receives a rpm signal from an engine speed detecting means (not shown). Such control of the on-off valves 123 should be accomplished at least during heavy load operation of the engine and they may be kept closed or opened during light load operation of the engine.

The surge tank 116 and the interconnecting passage 122 are formed side by side in an enlarged portion 126 formed at an intermediate portion of the intake passage. That is, the internal space of the enlarged portion 126 is divided into an upper space and a lower space by a partition wall 127, the former being larger than the latter and, the former and the latter respectively forming the surge tank 116 and the interconnecting passage 122. The communicating openings 121 are formed in the lower wall of the enlarged portion 126. The discrete passage portions 112 to 115 are bent upward and connected to a side of the surge tank 116 at the upstream end portions 112a to 115a.

Further, the upstream end portions 112a to 115a are formed along the peripheral surface of the enlarged portion 126, and the surge tank 116 and the upper portion of the upstream end portions 112a to 115a are integrally formed into a unit 126a. At the same time, the interconnecting passage 122 and the lower portion of the upstream end portions 112a to 115a are integrally formed into a unit 126b. The units 126a and 126b are connected together with the partition wall 127 intervening therebetween. The downstream end portion 112b to 115b are connected to the assembly of the units 126a and the 126b. This arrangement is advantageous in compactly forming the whole intake system.

The operation of the intake system of this embodiment will be apparent from the description in conjunction with FIGS. 1 to 5, and accordingly will not be described in detail here.

The arrangement of this embodiment is advantageous in that since the interconnecting passage 122 is formed side by side with the surge tank 116 by dividing the enlarged portion 126 of the intake passage by the partition wall 127, that is, since the interconnecting passage 122 is formed by a part of the wall (partition wall 127), the whole intake system can be compactly formed. Especially by forming the upstream end portions 112a to 115a of the discrete passage portions 112 to 115 along the peripheral surface of the enlarged portion 126, and forming the surge tank 116 and the upper portion of the upstream end portions 112a to 115a integrally with each other into the unit 126a, and forming the interconnecting passage 122 and the lower portion of the upstream end portions 112a to 115a integrally with each other into the unit 126b, the whole intake system can be more compactly formed.

Figure 11:
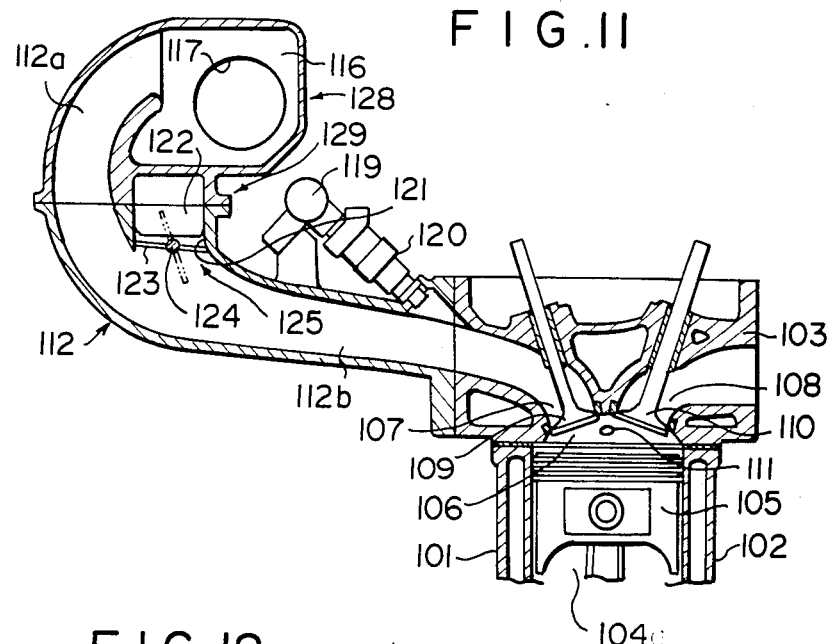

In another concrete embodiment of the present invention shown in FIG. 11, the interconnecting passage 122 is formed by a part of the outer wall portion of an enlarged portion 128 which forms the surge tank 116. That is, the interconnecting passage 122 is formed by a tank-like portion 129 which is formed side by side with the enlarged portion 128 forming the surge tank 116 and has a part of the wall in common with the enlarged portion 128. The upstream end portion 112a to 115a are formed along the periphery of the enlarged portion 128 and the tank-like portion 129. The enlarged portion 128, and the parts of the tank-like portion 129 and the discrete passage portions 112 to 115 above an intermediate portion of the tank-like portion 129 are formed integrally with each other, and the parts of the tanklike portion 129 and the discrete passage portion 112 to 115 below the intermediate portion of the tank-like portion 129 are formed integrally with each other.

Figure 7:
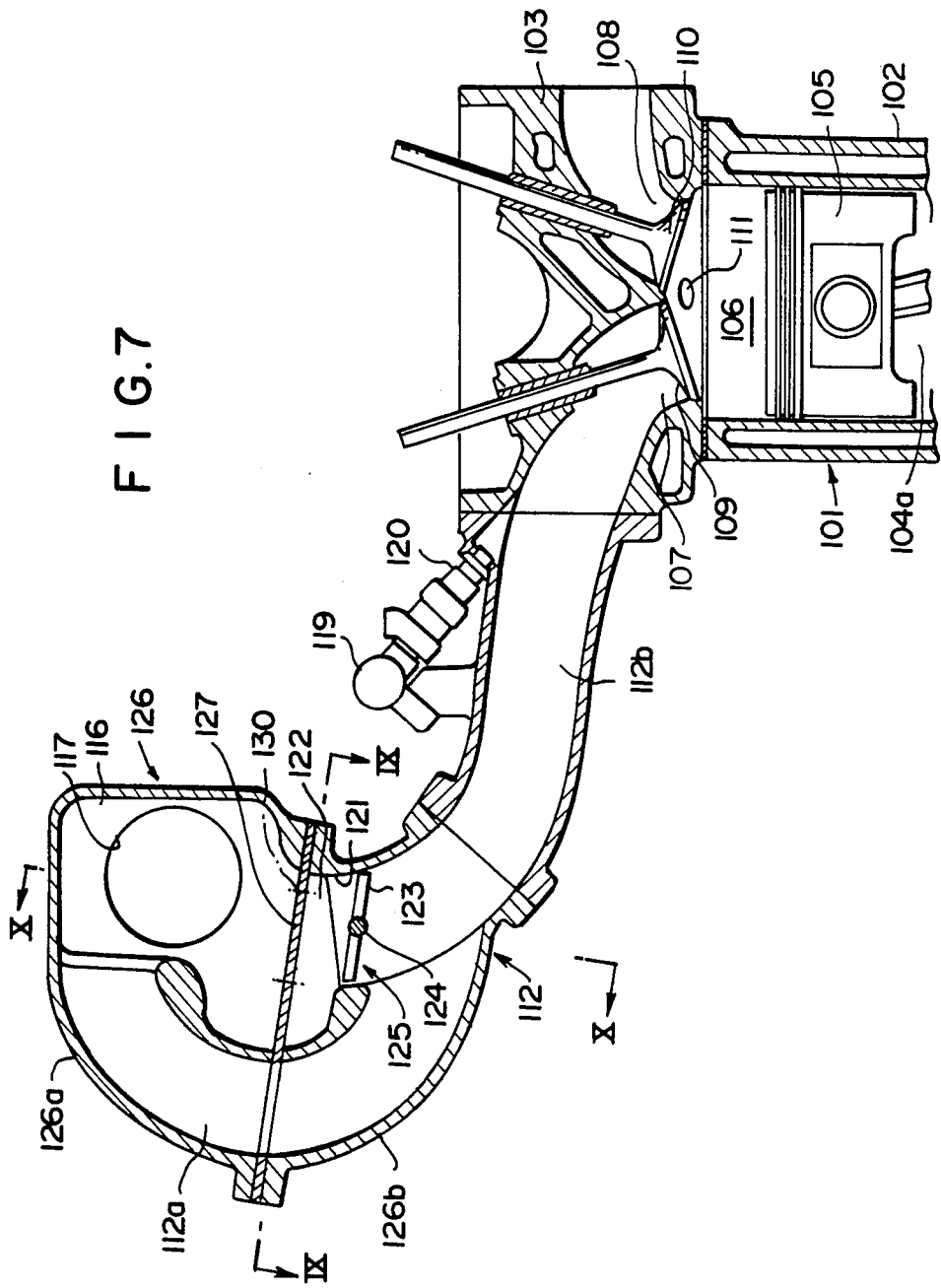
Figure 9:
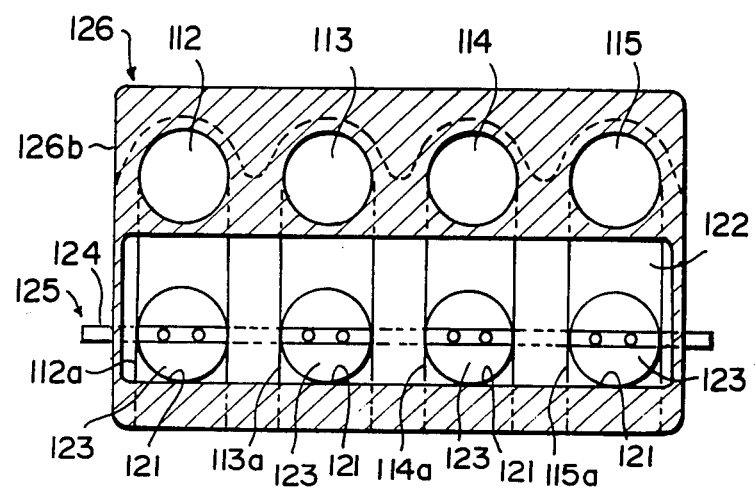
Figure 10:
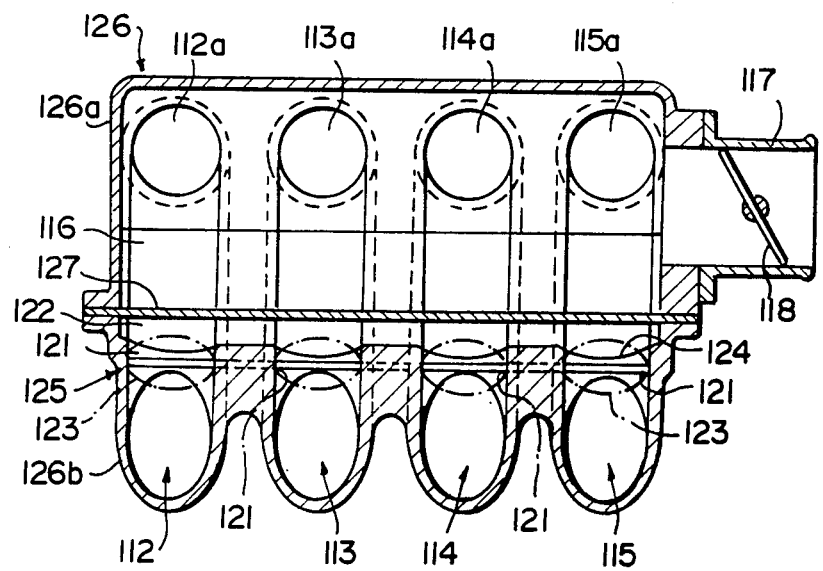

Though, in the embodiment described above, the interconnecting passage 122 is separate from the surge tank 116, the interconnecting passage 122 may communicated with the surge tank 116 by way of a communicating passage 130 as shown by the chained line in FIG. 7 so that intake air pressure vibrates between the surge tank 116 and the interconnecting passage 122 in the low engine speed range, thereby further increasing the volumetric efficiency.

Figure 12:
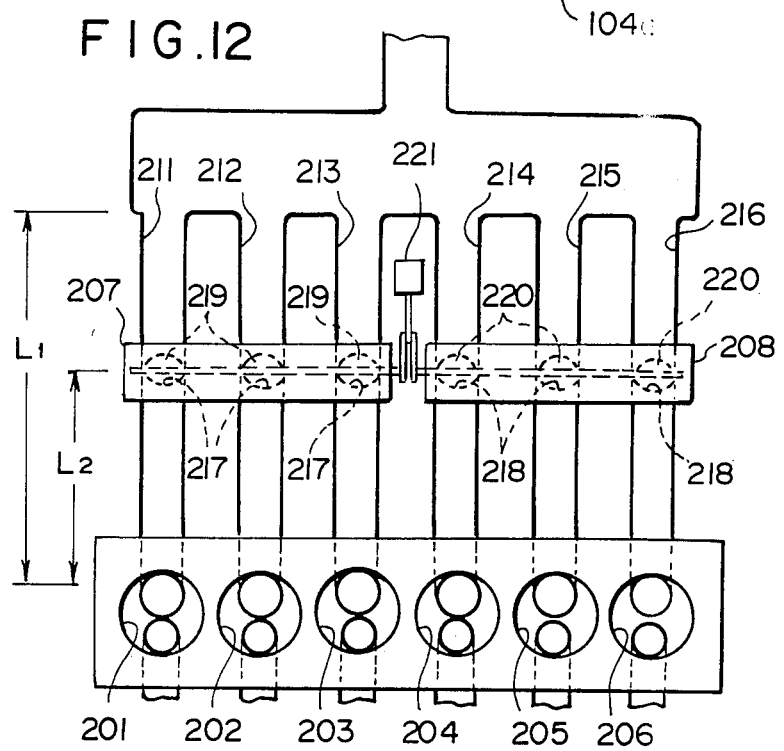

FIG. 12 shows still another embodiment of the present invention in which the present invention is applied to a six-cylinder engine.

In FIG. 12, a six-cylinder engine provided with first to sixth cylinders 201 to 206 from the left to the right, and the firing order in the engine is 1-5-3-6-2-4. That is, the intake stroke successively occurs in the first cylinder 201, fifth cylinder 205, third cylinder 203, sixth cylinder 206, second cylinder 202 and fourth cylinder 204 in this order. Discrete passage portions 211 to 213 respectively leading to the first third cylinders 201 to 203 are mutually communicated by a first interconnecting passage 207, and discrete passage portions 214 to 216 respectively leading to the fourth to sixth cylinders 204 to 206 are mutually connected by a second interconnecting passage 208. The first interconnecting passage 207 communicates with each of discrete passage portions 211 to 213 by way of communicating opening 217, and the second interconnecting passage 208 communicates with each of discrete passage portions 214 to 216 by way of communicating opening 218. Each communicating opening 217 is provided with an on-off valve 219 and each communicating opening 218 is provided with an on-off valve 220. The on-off valves 219 and 220 are opened and closed by an actuator 221. Though two interconnecting passages 207 and 208 are provided each to communicate three discrete passage portions in this embodiment, only one interconnecting passage may be provided to communicate all the discrete passage portions or three interconnecting passages may be provided each to communicate two discrete passage portions. That is, it is only necessary that each discrete passage portion is communicated with at least one of the other discrete passage portions. It is preferred that the intake stroke occurs at equal intervals in the discrete passage portions communicated by an interconnecting passage. That is, in the embodiment shown in FIG. 12, since the firing order is 1-5-3-6-2-4, in the discrete passage portions 211 to 213 mutually communicated by the first interconnecting passage 207 and in the discrete passage portions 214 to 216 mutually connected by the second interconnecting passage 208, the intake stroke occurs at intervals of 240°.

We claim:

1. An intake system for an internal combustion engine having a plurality of cylinders arranged along a first direction comprising:
   an intake passage including a common passage portion opening toward atmosphere and having a downstream end, a surge tank extending along said first direction and connected to the downstream end of the common passage portion, and a plurality of discrete passage portions, each of which branches from the surge tank via an opening and is respectively connected to one of the cylinders, the respective openings of the discrete passage portions being aligned in said first direction;
   at least one interconnecting passage provided to connect each of the discrete passage portions only with each other at a portion of each of the discrete passage portions downstream of the surge tank, said at least one interconnecting passage comprising a main interconnecting portion and discrete connecting portions connected at opposit ends to the main interconnecting portion and the respective discrete passage portions said main interconnecting portion being disposed adjacent to and below the surge tank;
   an on-off valve disposed at each junction of the at least one interconnecting passage with the discrete passage portions and in the respective discrete connecting portion, said on-off valve being adapted to move between an open position and a closing position, said junction being substantially spaced from where the discrete passage portions connect with the respectie cylinders; and
   an actuator which moves the on-off valves to the open positon as the engine speed increases at least during heavy load operation of the engine.

2. An intake system as defined in claim 1 in which all the discrete passage portions are communicated with each other by a single interconnecting passage.

3. An intake system as defined in claim 2 in which said cylinders are four in number.

4. An intake system as defined in claim 1 in which said surge tank is larged in volume than said interconnecting passage, each of the discrete passage portions have an overall length, the overall length of each discrete passage portion being substantially equal to the overall length of each of the other discrete passage portions, and a first portion of each discrete passage portion which is downstream of the junction with the interconnecting passage has a length, the length of the first portions of each of the discrete passage portions being substantially equal to the length of each of the first portions of each of the other discrete passage portions.

5. An intake system as defined in claim 4 in which said interconnecting passage is not smaller in the effective cross section than each of the discrete passage portions 6. An intake system as defined in claim 1 in which said surge tank and the interconnecting passage are integrally formed into a unit.

7. An intake system as defined in claim 6 in which a wall portion of the surge tank forms at least a part of a wall portion of the interconnecting passage.

8. An intake system as defined in claim 7 in which said surge tank is formed in an enlarged portion of the intake passage and the interconnecting passage is formed by a tanklike portion which is formed integrally with the enlarged portion forming the surge tank and has a part of a wall in common with the enlarged portion.

9. An intake system as defined in claim 8 in which upstream end portions of the discrete passage portions are formed along a periphery of the enlarged portion and the tank-like portion.

10. An intake system as defined in claim 9 in which the enlarged portion, and parts of the tank-like portion and the discrete passage portions above an intermediate portion of the tank-like portion are formed integrally with each other, and parts of the tank-like portion and the discrete passage portion below the intermediate portion of the tank-like portion are formed integrally with each other.

11. An intake system as defined in claim 10 in which said cylinders are four in number.

12. An intake system as defined in claim 10 in which said surge tank is larged in volume than said interconnecting passage, each of the discrete passage portions have an overall length, the overall length of each discrete passage portion being substantially equal to the overall length of each of the other discrete passage portions, and a first portion of each discrete passage portion which is downstream of the junction with the interconnecting passage has a length, the length of the first portions of each of the discrete passage portions being substantially equal to the length of each of the first portions of each of the other discrete passage portions.

13. An intake system as defined in claim 10 in which said interconnecting passage is not smaller in effective cross section than each of the discrete passage portions.

14. An intake system as defined in claim 7 in which said surge tank and the interconnecting passage are formed side by side in an enlarged portion formed at an intermediate portion of the intake passage.

15. An intake system as defined in claim 14 in which an internal space of the enlarged portion is divided into an upper space and a lower space by a partition wall, the former being larger than the latter, and the former and the latter respectively forming the surge tank and the interconnecting passage.

16. An intake system as defined in claim 15 in which the enlarged portion comprises a lower wall and the junctions of the interconnecting passage with the discrete passage portions are formed in the lower wall of the enlarged portion.

17. An intake system as defined in claim 16 in which upstream end portions of said discrete passage portions are bent upward along a periphery of said enlarged portion and connected to a side of the surge tank at the upstream end.

18. An intake system as defined in claim 17 in which the surge tank and the upper portion of the upstream end portions of the discrete passage portions are integrally formed into a first unit and the interconnecting passage and the lower portion of the upstream end portions are integrally formed into a second unit, said first and second units being connected together with the partition wall intervening therebetween.

19. An intake system as defined in claim 18 in which said cylinders are four in number.

20. An intake system as defined in claim 18 in which said surge tank is larger in volume than said interconnecting passage, and the discrete passage portions are substantially equal to each other both in the overall length and in the length of the portion downstream of the junction with the interconnecting passage.

21. An intake system as defined in claim 18 in which said interconnecting passage is not smaller in the effective cross section than each of the discrete passage portions.

22. An intake system for an internal combusion engine having a plurality of cylinders arranged along a first direction comprising:
an intake passage including a common passage portion opening toward atmosphere and having a downstream end, a surge tank extending along said first direction and connected to the downstream end of the common passage portion, and a plurality of discrete passage portions, each of which branches from the surge tank via an opening and is respectively connected to one of the cylinders, said discrete passage portions extending from the surge tank in a direction away from the engine before being bent so as to connect with the respective cylinders, the respective openings of the discrete passage portions being aligned in said first direction;
at least one interconnecting passage provided to connect each of the discrete passage portions only with each other at a portion of each of the discrete passage portions downstream of the surge tank, said at least one interconnecting passage being disposed in a space defined by the surge tank and the discrete passage portions and comprising a main interconnect and discrete connecting portion connected at opposite ends to the main interconnecting portion and the respective descrete passage portions said main interconnecting portion being disposed adjacent to the surge tank and along a common vertical plane with the surge tank
an on-off valve disposed at each junction of the at least one interconnecting passage with the discrete passage portions and in the respective discrete connecting portions, said on-off valve being adapted to move between an open position and a closing position, said junction being substantially spaced from where the discrete passage portions connect with the respective cylinders; and
an actuator which moves the on-off valves to the open position as the engine speed increases at least during heavy load operation of the engine.

23. An intake system as defined in claim 22 in which said surge tank and the at least one interconnecting passage are integrally formed into a unit.

24. An intake system as defined in claim 23 in which a wall portion of the surge tank forms at least a part of a wall portion of the at least one interconnecting passage.

25. An intake system as defined in claim 22 in which the discrete passage portions extend from the surge tank in a direction away from the engine before being downwardly bent and extending below the surge tank so as to connect with the respective cylinders.

26. An intake system as defined in claim 22 in which upstream end portions of said discrete passage portions are formed along a periphery of the surge tank and defined by a part of the wall portion forming the surge tank.

27. An intake system as defined in claim 26 in which said discrete passage portions are bent upward to be convex outwardly and said interconnecting passage is disposed below the surge tank on an inner side of the discrete passage portions.

28. An intake system as defined in claim 27 in which all the discrete passage portions are communicated with each other by a single interconnecting passage.

29. An intake system as defined in claim 28 in which said on-off valves are operatively connected to a single shaft so that all the on-off valves are opened and closed by operating the single shaft.

30. An intake system as defined in claim 29 in which said cylinders are four in number.

31. An intake system as defined claim 30 in which said surge tank is larger in volume than said interconnecting passage, each of the discrete passage portions have an overall length, the overall length of each discrete passage portion being substantially equal to the overall length of each of the other discrete passage portions, and a first portion of each discrete passage portion which is downstream of the junction with the interconnecting passge has a length, the length of the first portions of each of the discrete passage portions being substantially equal to the length of each of the first portions of each of the other discrete passage portions.

32. An intake system as defined in claim 30 in which said interconnecting passage is not smaller in its effective cross section than each of the discrete passage portions.

* * * * *